United States Patent
Masuda et al.

(10) Patent No.: US 11,156,172 B2
(45) Date of Patent: Oct. 26, 2021

(54) COMPRESSION RATIO VARYING MECHANISM

(71) Applicant: IHI CORPORATION, Tokyo (JP)

(72) Inventors: Yutaka Masuda, Tokyo (JP); Mitsuaki Hayashi, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 16/987,567

(22) Filed: Aug. 7, 2020

(65) Prior Publication Data

US 2020/0362774 A1 Nov. 19, 2020

Related U.S. Application Data

(63) Continuation of application No. PCT/JP2019/006665, filed on Feb. 21, 2019.

(30) Foreign Application Priority Data

Feb. 28, 2018 (JP) .............................. JP2018-034780

(51) Int. Cl.
| | |
|---|---|
| *F02D 15/02* | (2006.01) |
| *F02B 75/04* | (2006.01) |
| *F16N 7/38* | (2006.01) |
| *F16N 13/16* | (2006.01) |

(52) U.S. Cl.
CPC .............. *F02D 15/02* (2013.01); *F02B 75/04* (2013.01); *F16N 7/38* (2013.01); *F16N 13/16* (2013.01)

(58) Field of Classification Search
CPC .......... F02D 15/02; F02D 15/04; F02D 15/00; F02B 75/04; F02B 75/044; F02B 75/045; F02B 75/048; F16N 7/38; F16N 13/16
See application file for complete search history.

(56) References Cited

U.S. PATENT DOCUMENTS

| | | | | |
|---|---|---|---|---|
| 5,113,809 | A | * 5/1992 | Ellenburg | .............. F01B 3/0002 |
| | | | | 123/48 R |
| 2003/0029422 | A1 | 2/2003 | Magel | |
| 2006/0107927 | A1 | 5/2006 | Yamamoto | |
| 2016/0069465 | A1* | 3/2016 | Suzuki | ................ F15B 13/0433 |
| | | | | 137/625.48 |

(Continued)

FOREIGN PATENT DOCUMENTS

| | | |
|---|---|---|
| CN | 106414951 A | 2/2017 |
| DE | 10040526 A1 | 3/2002 |

(Continued)

OTHER PUBLICATIONS

International Search Report issued in Application No. PCT/JP2019/006665, dated Apr. 23, 2019, 4 pages.

*Primary Examiner* — Jacob M Amick

(74) *Attorney, Agent, or Firm* — Rothwell, Figg, Ernst & Manbeck, P.C.

(57) ABSTRACT

Provided is a compression ratio varying mechanism, including: a discharge oil passage connected to a first hydraulic chamber; a supply oil passage connected to a hydraulic pump; a pump cylinder including a first oil storage chamber connected to the discharge oil passage and the supply oil passage and a second oil storage chamber partitioned from the first oil storage chamber by a plunger; a branch oil passage connected to the second oil storage chamber; and an orifice provided in the branch oil passage.

6 Claims, 16 Drawing Sheets

(56) References Cited

U.S. PATENT DOCUMENTS

2016/0319739 A1* 11/2016 Yamada ................ F02B 75/045

FOREIGN PATENT DOCUMENTS

| | | |
|---|---|---|
| DE | 102005055451 A1 | 6/2006 |
| EP | 3098417 A1 | 11/2016 |
| JP | S59-110878 A | 6/1984 |
| JP | 2004-506839 A | 3/2004 |
| JP | 2005-282618 A | 10/2005 |
| JP | 2006-144698 A | 6/2006 |
| JP | 2013-139316 A | 7/2013 |
| JP | WO 2014/170977 A | 10/2014 |
| JP | WO2015/108182 A1 | 7/2015 |
| KR | 10-2016-0090393 A | 7/2016 |
| WO | 02/14681 A1 | 2/2002 |
| WO | 2014/170977 A1 | 10/2014 |
| WO | 2015/108182 A1 | 7/2015 |

* cited by examiner

COMPRESSION RATIO VARYING MECHANISM

CROSS REFERENCE TO RELATED APPLICATIONS

This application is a continuation application of International Application No. PCT/JP2019/006665, filed on Feb. 21, 2019, which claims priority to Japanese Patent Application No. 2018-034780, filed on Feb. 28, 2018, the entire contents of which are incorporated by reference herein.

BACKGROUND ART

Technical Field

The present disclosure relates to a compression ratio varying mechanism.

Related Art

A crosshead type engine includes a piston, a piston rod, a crosshead, a crosshead pin, a connecting rod, and a crankshaft. The piston reciprocates in a cylinder. The piston rod has one end coupled to the piston, and another end coupled to the crosshead through intermediation of the crosshead pin. The connecting rod has one end coupled to the crosshead through intermediation of the crosshead pin, and another end coupled to the crankshaft. The crosshead reciprocates integrally with the piston through the piston rod. The crankshaft rotates operatively in association with the reciprocation of the piston and the crosshead through the connecting rod.

Some of the crosshead type engines include a compression ratio varying mechanism configured to change positions of a top dead center and a bottom dead center of the piston. The compression ratio varying mechanism varies, for example, a relative position between the piston rod and the crosshead pin in a stroke direction of the piston. The compression ratio varying mechanism according to Patent Literature 1 includes a plunger pump. The plunger pump supplies working oil to a hydraulic chamber formed between the piston rod and the crosshead pin. The plunger pump is attached to the crosshead pin, and moves integrally with the crosshead pin. The plunger pump sucks and discharges the working oil in accordance with a movement of the crosshead pin. The plunger pump sucks the working oil, to thereby store the working oil inside. The plunger pump discharges the working oil stored inside, to thereby supply the working oil to the hydraulic chamber. A top dead center position of the piston is changed through the supply of the working oil to the hydraulic chamber.

CITATION LIST

Patent Literature

Patent Literature 1: WO 2015/108182 A1

SUMMARY

Technical Problem

However, the plunger pump sucks and discharges the working oil in a very short period in which the piston moves in a vicinity of the bottom dead center. When the working oil is quickly sucked into the plunger pump in this state, a supply pressure becomes negative, and there is thus a fear in that cavitation may occur.

The present disclosure has an object to provide a compression ratio varying mechanism capable of suppressing occurrence of cavitation.

Solution to Problem

In order to solve the above-mentioned problem, according to one mode of the present disclosure, there is provided a compression ratio varying mechanism, including: a discharge oil passage connected to a hydraulic chamber; a supply oil passage connected to a hydraulic pressure supply source; a pump cylinder including: a first oil storage chamber connected to the discharge oil passage and the supply oil passage; and a second oil storage chamber partitioned from the first oil storage chamber by a plunger; a communication passage connected to the second oil storage chamber; and an orifice provided in the communication passage.

The communication passage may be configured to allow the first oil storage chamber and the second oil storage chamber to communicate with each other.

The compression ratio varying mechanism may further include: a bypass oil passage configured to connect a side of the first oil storage chamber and a side of the second oil storage chamber of the communication passage with each other with the orifice as a boundary; and a check valve, which is provided in the bypass oil passage, and is configured to limit a flow of working oil from the second oil storage chamber to the first oil storage chamber.

In order to solve the above-mentioned problem, according to one mode of the present disclosure, there is provided a compression ratio varying mechanism, including: a discharge oil passage connected to a hydraulic chamber; a pump cylinder including an oil storage chamber connected to the discharge oil passage; a supply oil passage configured to connect the oil storage chamber and a hydraulic pressure supply source with each other; and an accumulator connected to the supply oil passage.

The compression ratio varying mechanism may further include an orifice provided between a connection point of the supply oil passage to the accumulator and the hydraulic pressure supply source.

Effects of Disclosure

According to the compression ratio varying mechanism of the present disclosure, it is possible to suppress occurrence of cavitation.

DESCRIPTION OF EMBODIMENTS

Figure 1:
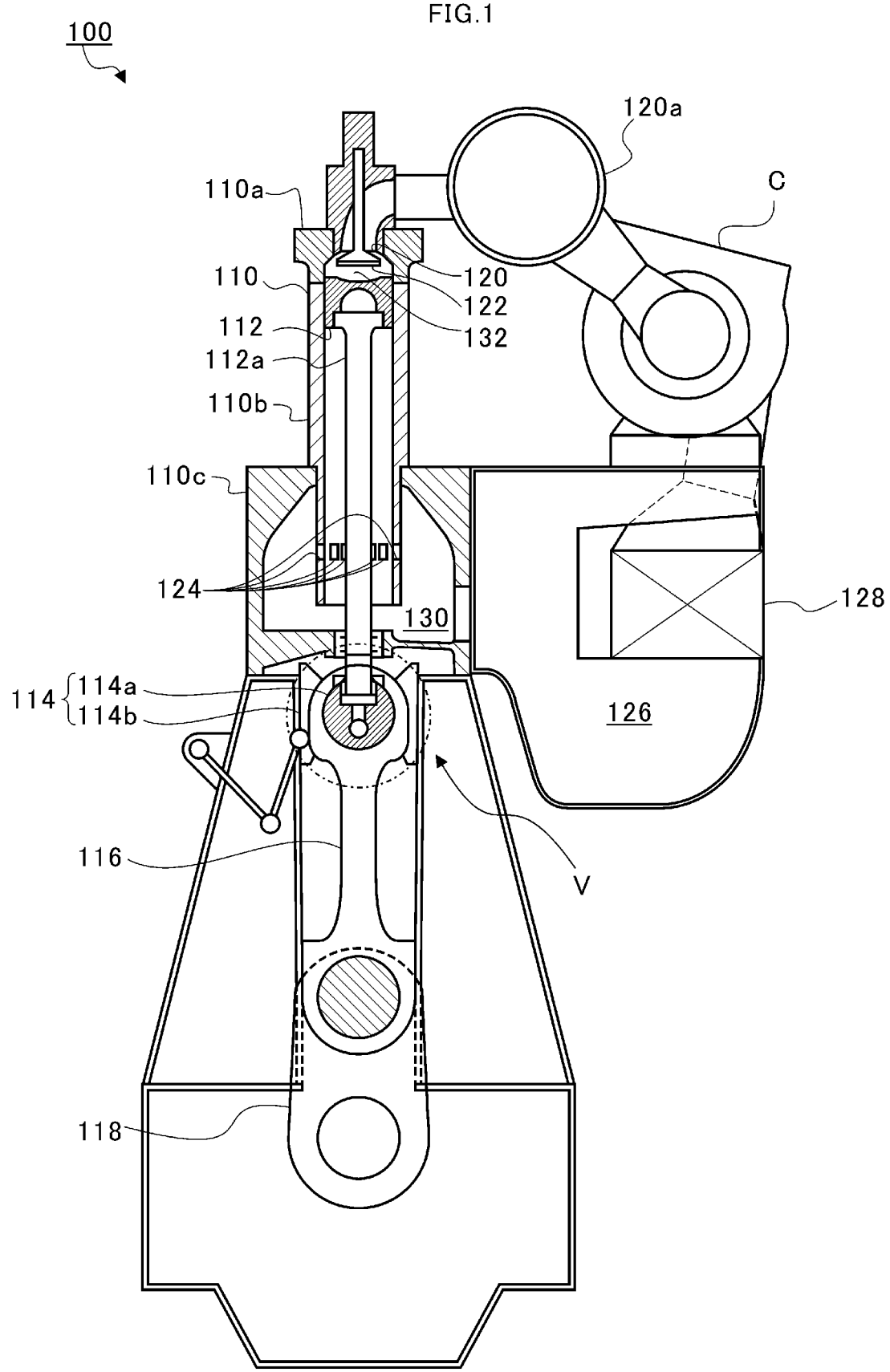
FIG. 1 is an explanatory view for illustrating an overall configuration of a uniflow scavenging type two-cycle engine (crosshead type engine).

Now, with reference to the attached drawings, an embodiment of the present disclosure is described in detail. The dimensions, materials, and other specific numerical values represented in the embodiments are merely examples used for facilitating the understanding of the disclosure, and do not limit the present disclosure otherwise particularly noted. Elements having substantially the same functions and configurations herein and in the drawings are denoted by the same reference symbols to omit redundant description thereof. Further, illustration of elements with no direct relationship to the present disclosure is omitted.

In the embodiment, a description is given of an example of an engine of a uniflow scavenging type in which one cycle is constituted by two cycles (two strokes), and gas flows inside a cylinder in one direction. Moreover, in the embodiment, a description is given of an example of an engine of so-called dual fuel type that can selectively operate any one of operation modes including a gas operation mode and a diesel operation mode. In the gas operation mode, fuel gas, which is a gas fuel, is mainly burnt. In the diesel operation mode, fuel oil, which is a liquid fuel, is burnt. However, the type of the engine is not limited to the dual fuel type, the two-cycle type, the uniflow scavenging type, and the crosshead type, and only needs to be a reciprocating engine.

FIG. 1 is an explanatory view for illustrating an overall configuration of a uniflow scavenging type two-cycle engine (crosshead type engine) 100. The uniflow scavenging type two-cycle engine 100 in this embodiment is used for, for example, a ship. The uniflow scavenging type two-cycle engine 100 includes a cylinder 110, a piston 112, a crosshead 114, a connecting rod 116, a crankshaft 118, an exhaust port 120, an exhaust valve 122, scavenging ports 124, a scavenge reservoir 126, a cooler 128, a scavenge chamber 130, and a combustion chamber 132.

In the uniflow scavenging type two-cycle engine 100, exhaust, intake, compression, combustion, and expansion are executed during two strokes of the piston 112, which include an upstroke and a downstroke, and the piston 112 consequently reciprocates in the cylinder 110. One end of a piston rod 112a is coupled to the piston 112. A crosshead pin 114a in the crosshead 114 is coupled to another end of the piston rod 112a. The crosshead 114 reciprocates integrally with the piston 112. A movement of the crosshead 114 in a direction perpendicular to a stroke direction of the piston 112 (right-and-left direction of FIG. 1) is restricted by a crosshead shoe 114b.

The crosshead pin 114a is inserted through a hole provided at one end of the connecting rod 116. The crosshead pin 114a supports the one end of the connecting rod 116. Another end of the connecting rod 116 is coupled to the crankshaft 118. The crankshaft 118 is configured to be rotatable with respect to the connecting rod 116. When the crosshead 114 reciprocates as the piston 112 reciprocates, the crankshaft 118 rotates operatively in association with the reciprocation of the crosshead 114.

The exhaust port 120 is an opening provided in a cylinder head 110a above a top dead center of the piston 112. The exhaust port 120 is opened and closed so that exhaust gas generated in the cylinder 110 after the combustion is discharged. The exhaust valve 122 is slid up and down at predetermined timings by an exhaust valve drive device (not shown) so that the exhaust port 120 is opened and closed. The exhaust gas discharged through the exhaust port 120 is supplied to a turbine side of a turbocharger C through an exhaust pipe 120a, and is then discharged to the outside.

The scavenging ports 124 are holes passing from an inner peripheral surface (inner peripheral surface of a cylinder liner 110b) to an outer peripheral surface of the cylinder 110 on a bottom end side. A plurality of scavenging ports 124 are formed over an entire circumference of the cylinder 110. The exhaust ports 124 suck active gas into the cylinder 110 in accordance with a sliding motion of the piston 112. Such active gas includes oxidant such as oxygen and ozone or a mixture thereof (for example, air).

The active gas (for example, air) having been pressurized by a compressor of the turbocharger C is enclosed in the scavenge reservoir 126, and the active gas is cooled by the cooler 128. The cooled active gas is forced into the scavenge chamber 130 formed in the cylinder jacket 110c. The active gas is sucked from the scavenging ports 124 into the cylinder 110 by a differential pressure between the scavenge chamber 130 and the cylinder 110.

A pilot injection valve (not shown) is provided in the cylinder head 110a. In the gas operation mode, fuel oil in an appropriate amount is injected from the pilot injection valve at a desired time point in the engine cycle. Such fuel oil is vaporized to fuel gas by heat of the combustion chamber 132 surrounded by the cylinder head 110a, the cylinder liner 110b, and the piston 112. The fuel gas vaporized by the heat of the combustion chamber 132 is spontaneously ignited, is burnt in a short period, and extremely increases the temperature in the combustion chamber 132. As a result, the uniflow scavenging type two-cycle engine 100 can reliably burn the fuel gas having flowed into the cylinder 110 at a desired timing. The piston 112 reciprocates by an expansion pressure generated mainly by the combustion of the fuel gas.

In this case, the fuel gas is produced by, for example, gasifying a liquefied natural gas (LNG). However, the fuel gas is not limited to those produced by gasifying the LNG, and there may also be used fuel gas produced by gasifying, for example, a liquefied petroleum gas (LPG), a light oil, or a heavy oil.

Meanwhile, in the diesel operation mode, the fuel oil in a larger amount than the injection amount of the fuel oil in the gas operation mode is injected from the pilot injection valve.

The piston 112 reciprocates through an expansion pressure generated by the combustion of the fuel oil, not the fuel gas.

As described above, the uniflow scavenging type two-cycle engine 100 selectively operates in any one of the operation modes including the gas operation mode and the diesel operation mode. The uniflow scavenging type two-cycle engine 100 includes a compression ratio varying mechanism V so that the compression ratio of the piston 112 is varied in accordance with each selected mode. A detailed description is now given of a configuration of the compression ratio varying mechanism V.

Figure 2A:
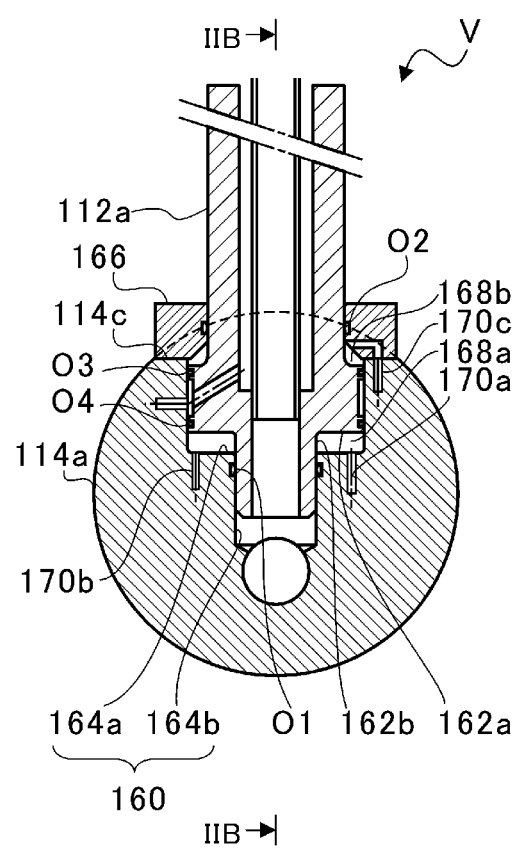
FIG. 2A is an extracted enlarged view for illustrating a portion indicated by a one-dot chain line of FIG. 1.
Figure 2B:
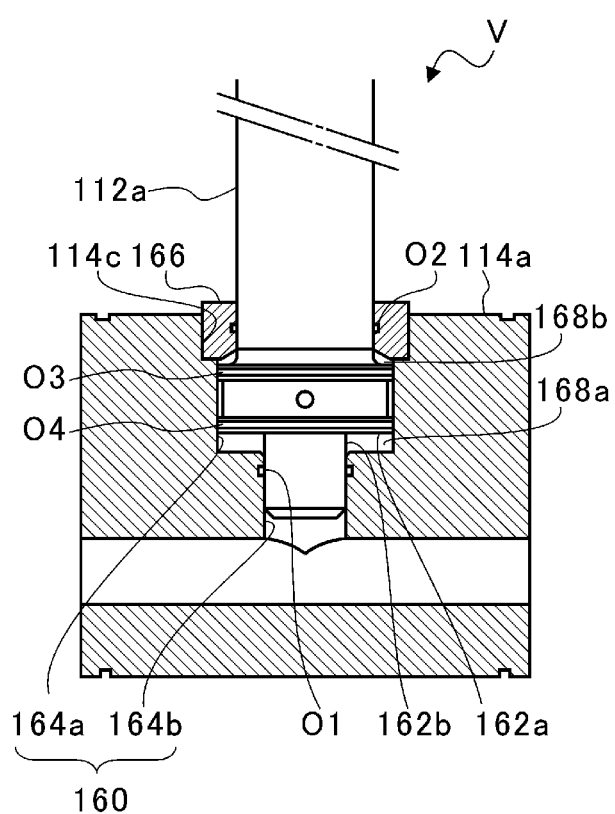
FIG. 2B is a sectional view taken along the line IIB-IIB of FIG. 2A.

FIG. 2A is an extracted enlarged view for illustrating a portion of a one-dot chain line of FIG. 1. FIG. 2B is a sectional view taken along the line IIB-IIB of FIG. 2A. In FIG. 2A and FIG. 2B, a coupling portion between the piston rod 112a and the crosshead pin 114a is illustrated.

As illustrated in FIG. 2A and FIG. 2B, an end portion of the piston rod 112a is inserted into the crosshead pin 114a. Specifically, a connecting hole 160 extending perpendicularly to an axial direction (right-and-left direction of FIG. 2B) of the crosshead pin 114a is formed in the crosshead pin 114a. The connecting hole 160 constitutes a hydraulic chamber, and the end portion of the piston rod 112a is inserted into (enters) the hydraulic chamber. The end portion of the piston rod 112a is inserted into the connecting hole 160, thereby coupling the crosshead pin 114a and the piston rod 112a with each other.

The piston rod 112a has a large-diameter portion 162a and a small-diameter portion 162b. The large-diameter portion 162a has an outer diameter larger than that of one end side of the piston rod 112a. The small-diameter portion 162b is located on another end side with respect to the large-diameter portion 162a, and has an outer diameter smaller than that of the large-diameter portion 162a.

The connecting hole 160 includes a large-diameter hole portion 164a and a small-diameter hole portion 164b. The large-diameter hole portion 164a is located on the piston 112 side in the connecting hole 160. The small-diameter hole portion 164b is continues with the large-diameter hole portion 164a on the connecting rod 116 side, and has an inner diameter smaller than that of the large-diameter hole portion 164a.

The small-diameter portion 162b of the piston rod 112a has such a dimensional relationship that the small-diameter portion 162b can be inserted into the small-diameter hole portion 164b of the connecting hole 160. The large-diameter portion 162a of the piston rod 112a has such a dimensional relationship that the large-diameter portion 162a can be inserted into the large-diameter hole portion 164a of the connecting hole 160. A first seal member O1 formed of an O-ring is arranged in an inner peripheral surface of the small-diameter hole portion 164b.

A fixing lid 166 having an outer diameter larger than that of the connecting hole 160 is arranged on the one end side of the piston rod 112a with respect to the large-diameter portion 162a of the piston rod 112a. The fixing lid 166 is an annular member, and the piston rod 112a is inserted through the fixing lid 166. A second seal member O2 formed of an O-ring is arranged in an inner peripheral surface of the fixing lid 166 through which the piston rod 112a is inserted.

A recess 114c recessed in a radial direction of the crosshead pin 114a is formed in an outer peripheral surface of the crosshead pin 114a. The fixing lid 166 is in contact with the recess 114c.

A first hydraulic chamber (hydraulic chamber) 168a and a second hydraulic chamber 168b are formed in the coupling portion between the piston rod 112a and the crosshead pin 114a, and inside the crosshead pin 114a.

The first hydraulic chamber 168a is surrounded by a stepped surface defined by a difference in outer diameter between the large-diameter portion 162a and the small-diameter portion 162b, an inner peripheral surface of the large-diameter hole portion 164a, and a stepped surface defined by a difference in inner diameter between the large-diameter hole portion 164a and the small-diameter hole portion 164b.

The stepped surface defined by the difference in outer diameter between the large-diameter portion 162a and the small-diameter portion 162b of the piston rod 112a is opposed to the stepped surface defined by the difference in inner diameter between the large-diameter hole portion 164a and the small-diameter hole portion 164b of the crosshead pin 114a. The stepped surface defined by the difference in outer diameter between the large-diameter portion 162a and the small-diameter portion 162b of the piston rod 112a is hereinafter simply referred to as "stepped surface of the piston rod 112a". Moreover, the stepped surface defined by the difference in inner diameter between the large-diameter hole portion 164a and the small-diameter hole portion 164b of the crosshead pin 114a is hereinafter simply referred to as "stepped surface of the crosshead pin 114a". The stepped surface of the piston rod 112a and the stepped surface of the crosshead pin 114a form opposed portions opposed to one another. The opposed portions of the piston rod 112a and the crosshead pin 114a form the first hydraulic chamber 168a.

The second hydraulic chamber 168b is surrounded by an end surface of the large-diameter portion 162a on the one end side of the piston rod 112a, the inner peripheral surface of the large-diameter hole portion 164a, and the fixing lid 166. That is, the large-diameter hole portion 164a is partitioned into the one end side and the another end side of the piston rod 112a by the large-diameter portion 162a of the piston rod 112a. The first hydraulic chamber 168a is formed of the large-diameter hole portion 164a partitioned on the another end side with respect to the large-diameter portion 162a. The second hydraulic chamber 168b is formed of the large-diameter hole portion 164a partitioned on the one end side with respect to the large-diameter portion 162a.

A first oil passage 170a and a second oil passage 170b communicate with the first hydraulic chamber 168a. The first oil passage 170a has one end opened in the inner peripheral surface (first hydraulic chamber 168a) of the large-diameter hole portion 164a, and another end communicating with a plunger pump described later. The second oil passage 170b has one end opened in the inner peripheral surface of the large-diameter hole portion 164a, and another end communicating with a spill valve described later.

An auxiliary oil passage 170c opened in a wall surface of the fixing lid 166 communicates with the second hydraulic chamber 168b. The auxiliary oil passage 170c communicates with a hydraulic pump through the contact portion between the fixing lid 166 and the crosshead pin 114a, and through the inside of the crosshead pin 114a.

Figure 3A:
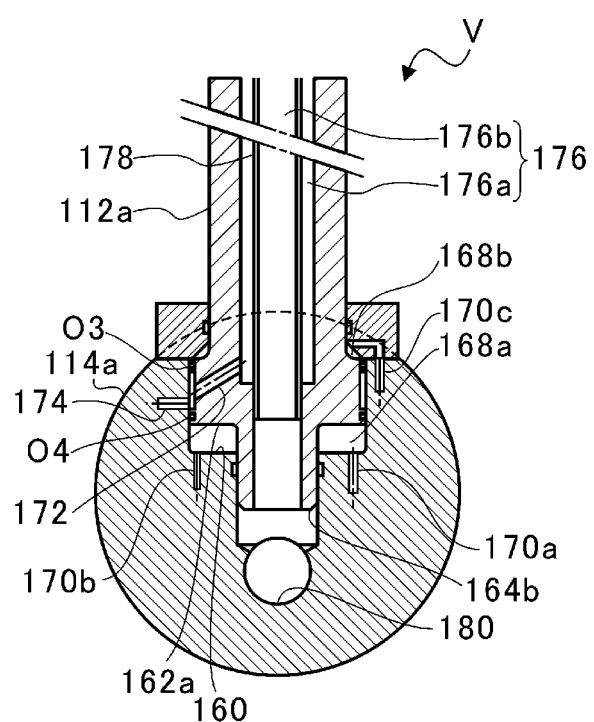
FIG. 3A is a view for illustrating a state in which a piston rod has shallowly entered a connecting hole.
Figure 3B:
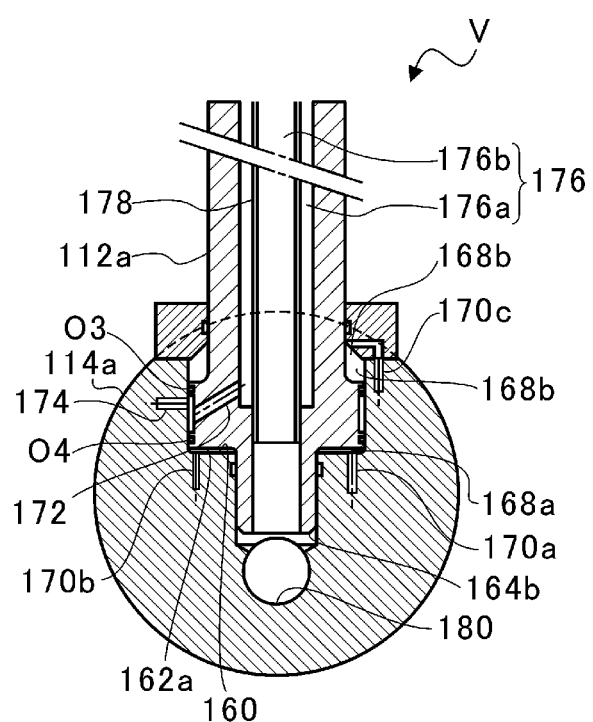
FIG. 3B is a view for illustrating a state in which the piston rod has deeply entered the connecting hole.

FIG. 3A is a view for illustrating a state in which the piston rod 112a shallowly enters the connecting hole 160. FIG. 3B is a view for illustrating a state in which the piston rod 112a deeply enters the connecting hole 160. In FIG. 3A and FIG. 3B, a change in relative position between the piston rod 112a and the crosshead pin 114a is illustrated.

The first hydraulic chamber 168a has a length which is variable in the stroke direction of the piston 112. When the working oil is supplied to the first hydraulic chamber 168a, and the first hydraulic chamber 168a is sealed in the state illustrated in FIG. 3A, the state of FIG. 3A is maintained due to the incompressibility of the working oil.

When the spill valve described later is opened in this state, the working oil sealed in the first hydraulic chamber 168a is discharged from the first hydraulic chamber 168a through the second oil passage 170b. Specifically, the working oil is discharged from the first hydraulic chamber 168a toward a spill valve side through the second oil passage 170b by compressive loads from the piston rod 112a and the crosshead pin 114a generated by the reciprocation of the piston 112. As a result, as illustrated in FIG. 3B, the length of the first hydraulic chamber 168a is reduced in the stroke direction of the piston 112. Meanwhile, a length of the second hydraulic chamber 168b is increased in the stroke direction of the piston 112.

As described above, the piston rod 112a and the crosshead pin 114a change an overall length of the piston rod 112a, the crosshead pin 114a, and the piston 112 in the stroke direction in accordance with a separation distance between the opposed portions in the stroke direction. In other words, the overall length of the piston rod 112a, the crosshead pin 114a, and the piston 112 in the stroke direction changes in accordance with the separation distance between the stepped surface of the piston rod 112a and the stepped surface of the crosshead pin 114a in the stroke direction.

An entry position (entry depth) up to which the piston rod 112a enters the connecting hole (hydraulic chambers) 160 of the crosshead pin 114a is changed by the amount of the change in length of the first hydraulic chamber 168a and the second hydraulic chamber 168b in the stroke direction of the piston 112. The positions of the top dead center and the bottom dead center of the piston 112 are changed through changing the relative position between the piston rod 112a and the crosshead pin 114a. As described above, the compression ratio varying mechanism V changes the positions of the top dead center and the bottom dead center of the piston 112, to thereby vary the compression ratio of the piston 112.

Incidentally, when the piston 112 reaches the top dead center in the state illustrated in FIG. 3B, the position of the crosshead pin 114a in the stroke direction of the piston 112 is maintained by the connecting rod 116. Meanwhile, the piston rod 112a is coupled to the crosshead pin 114a, but has play by an amount of the second hydraulic chamber 168b.

Therefore, the inertial force of the piston rod 112a is large depending on the rotation speed of the uniflow scavenging type two-cycle engine 100, and there is a risk in that the piston rod 112a moves toward the piston 112 side. When the piston rod 112a moves toward the piston 112 side, the top dead center position of the piston 112 is displaced. The hydraulic pressure acts on the second hydraulic chamber 168b from the hydraulic pump through the auxiliary oil passage 170c, to thereby suppress the movement of the piston rod 112a so that the top dead center position of the piston 112 is not displaced.

The uniflow scavenging type two-cycle engine 100 is used at a relatively low rotation speed, and the inertial force of the piston rod 112a is thus relatively small. Therefore, even when the hydraulic pressure supplied to the second hydraulic chamber 168b is low, the displacement of the top dead center position can be suppressed.

A flow passage hole 172 extending from an outer peripheral surface toward a radially inner side of the piston rod 112a is provided in the piston rod 112a. A through hole 174 passing from an outer peripheral surface side of the crosshead pin 114a to the connecting hole 160 is provided in the crosshead pin 114a. The through hole 174 communicates with the hydraulic pump.

The flow passage hole 172 and the through hole 174 are opposed to one another in the radial direction of the piston rod 112a. The flow passage hole 172 communicates with the through hole 174. In this configuration, an end portion of the flow passage hole 172 on the outer peripheral surface side is formed so as to have a wider flow passage width in the stroke direction (up-and-down direction of FIG. 3A and FIG. 3B) of the piston 112 than other portion of the flow passage hole 172. Thus, as illustrated in FIG. 3A and FIG. 3B, even when the relative position between the piston rod 112a and the crosshead pin 114a changes, the communication state between the flow passage hole 172 and the through hole 174 is maintained.

A third seal member O3 and a fourth seal member O4 are arranged in the outer peripheral surface of the piston rod 112a on both sides of the end portion of the flow passage hole 172 on the outer peripheral surface side in the axial direction of the piston rod 112a. Each of the third seal member O3 and the fourth seal member O4 is formed of an O-ring.

An area of the large-diameter portion 162a opposed to the inner peripheral surface of the large-diameter hole portion 164a is reduced by an amount of the flow passage hole 172. When the area of the large-diameter portion 162a opposed to the inner peripheral surface of the large-diameter hole portion 164a decreases, the large-diameter portion 162a is more liable to be inclined with respect to the large-diameter hole portion 164a. However, in this configuration, the small-diameter portion 162b is guided by the small-diameter hole portion 164b, and the inclination with respect to the stroke direction of the piston rod 112a is thus suppressed.

A cooling oil passage 176 extending in the stroke direction of the piston 112 is formed inside the piston rod 112a. Cooling oil for cooling the piston 112 and the piston rod 112a flows through the cooling oil passage 176. A cooling pipe 178 is arranged inside the cooling oil passage 176. The cooling oil passage 176 is divided by the cooling pipe 178 into an outward passage 176a on the outer side and a return passage 176b on the inner side in the radial direction of the piston rod 112a. The flow passage hole 172 is opened in the outward passage 176a of the cooling oil passage 176.

The cooling oil supplied from the hydraulic pump flows into the outward passage 176a of the cooling oil passage 176 through the through hole 174 and the flow passage hole 172. The outward passage 176a and the return passage 176b communicate with each other inside the piston 112. When the cooling oil having flowed through the outward passage 176a reaches an inner wall of the piston 112, the cooling oil passes through the return passage 176b, and returns to the small-diameter portion 162b side. The cooling oil comes in contact with an inner wall of the cooling oil passage 176 and the inner wall of the piston 112, thereby cooling the piston 112.

An outlet hole 180 extending in the axial direction of the crosshead pin 114a is formed in the crosshead pin 114a. The small-diameter hole portion 164b communicates with the outlet hole 180. The cooling oil having flowed from the cooling oil passage 176 into the small-diameter hole portion 164b after cooling the piston 112 passes through the outlet hole 180, and is discharged to the outside of the crosshead pin 114a. The cooling oil discharged to the outside of the crosshead pin 114a flows back to a tank.

Both of the working oil supplied to the first hydraulic chamber 168a and the second hydraulic chamber 168b and the cooling oil supplied to the cooling oil passage 176 flow back to the same tank, and are increased in pressure by the same hydraulic pump. Therefore, the supply of the working oil that applies the hydraulic pressure and the supply of the cooling oil for the cooling can be executed by the one hydraulic pump, thereby being capable of reducing a cost.

The compression ratio varying mechanism V includes a hydraulic pressure adjustment mechanism 196 configured to adjust the hydraulic pressure in the first hydraulic chamber 168a. A detailed description is now given of a configuration of the hydraulic pressure adjustment mechanism 196.

Figure 4:
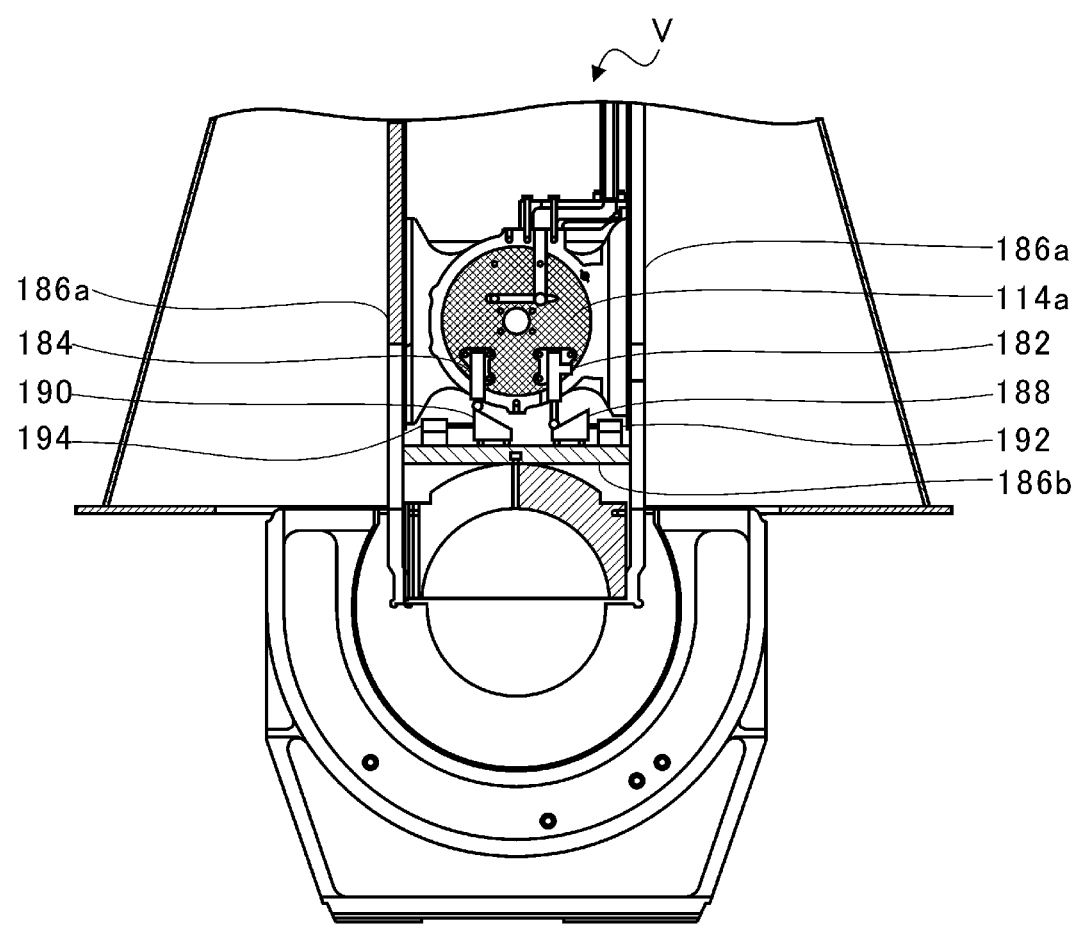
FIG. 4 is an explanatory view for illustrating an arrangement of a hydraulic pressure adjustment mechanism.

FIG. 4 is an explanatory view for illustrating an arrangement of the hydraulic pressure adjustment mechanism 196. In FIG. 4, an appearance and a partial section in a vicinity of the crosshead 114 of the uniflow scavenging type two-cycle engine 100 are illustrated. As illustrated in FIG. 4, the hydraulic pressure adjustment mechanism 196 is arranged in the vicinity of the crosshead 114. The hydraulic pressure adjustment mechanism 196 includes a plunger pump 182, a spill valve 184, a first cam plate 188, a second cam plate 190, a first actuator 192, and a second actuator 194. The plunger pump 182 and the spill valve 184 are respectively arranged in the crosshead pin 114a indicated by crosshatching of FIG. 4.

Two guide plates 186a configured to guide the reciprocation of the crosshead 114 are arranged on both sides (right-and-left direction of FIG. 4) of the crosshead 114. An engine bridge 186b is arranged between the two guide plates 186a. Both ends of the engine bridge 186b in the right-and-left direction of FIG. 4 are connected to the two guide plates 186a. The engine bridge 186b supports the two guide plates 186a. The engine bridge 186b is arranged below each of the plunger pump 182 and the spill valve 184. The first cam plate 188 and the second cam plate 190 are placed on the engine bridge 186b. Moreover, the first actuator 192 and the second actuator 194 are placed on the engine bridge 186b. The first cam plate 188 and the second cam plate 190 can be moved by the first actuator 192 and the second actuator 194, respectively, on the engine bridge 186b in the left-and-right direction of FIG. 4.

The plunger pump 182 and the spill valve 184 reciprocate integrally with the crosshead pin 114a in the stroke direction of the piston 112. Meanwhile, the first cam plate 188 and the second cam plate 190 are placed on the engine bridge 186b, and do not move in the stroke direction of the piston 112 with respect to the engine bridge 186b.

Figure 5:
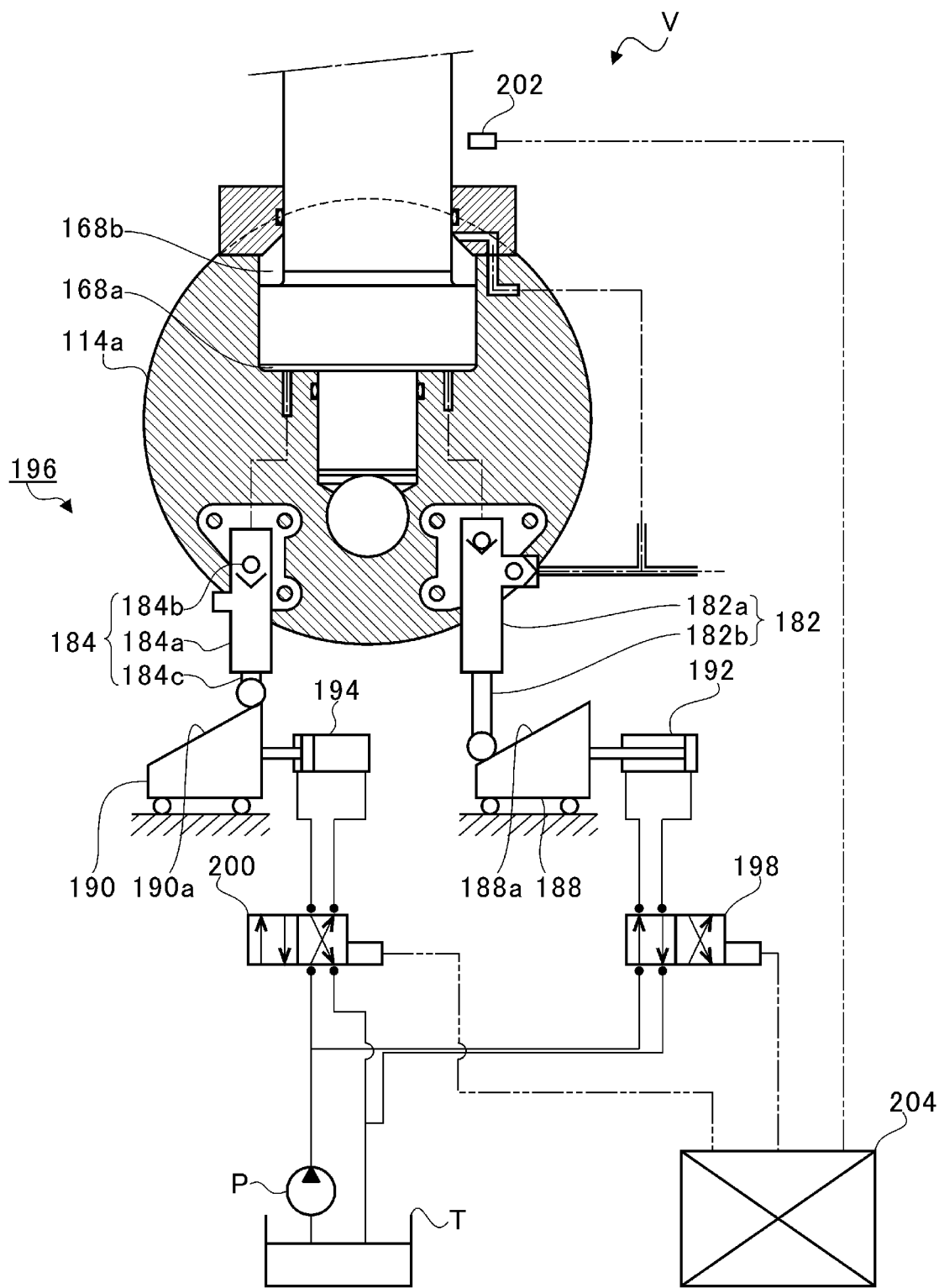
FIG. 5 is an explanatory view for illustrating a detailed configuration of the hydraulic pressure adjustment mechanism.

FIG. 5 is an explanatory view for illustrating a detailed configuration of the hydraulic pressure adjustment mechanism 196. As illustrated in FIG. 5, the hydraulic pressure adjustment mechanism 196 includes a first selector valve 198, a second selector valve 200, a position sensor 202, and a hydraulic pressure controller 204.

The plunger pump 182 includes a pump cylinder 182a and a plunger 182b. The working oil is introduced into an inside of the pump cylinder 182a through a supply oil passage communicating with the hydraulic pump (hydraulic pressure supply source) P. The plunger 182b moves in the pump cylinder 182a in the stroke direction. One end of the plunger 182b protrudes from the pump cylinder 182a.

The first cam plate 188 includes an inclined surface 188a inclined with respect to the stroke direction of the piston 112. The first cam plate 188 is arranged below the plunger pump 182 in the stroke direction. When the plunger pump 182 moves integrally with the crosshead pin 114a in the stroke direction, the one end of the plunger 182b protruding from the pump cylinder 182a comes in contact with the inclined surface 188a of the first cam plate 188 at a crank angle close to the bottom dead center.

The plunger 182b receives a reaction force corresponding to a reciprocating force of the crosshead 114 from the inclined surface 188a of the first cam plate 188, and is consequently pushed into the pump cylinder 182a. When the plunger 182b is pushed into the pump cylinder 182a, the plunger pump 182 supplies (presses) the working oil in the pump cylinder 182a to (into) the first hydraulic chamber 168a.

The first actuator 192 is operated through use of, for example, the hydraulic pressure of the working oil supplied through the first selector valve 198. The first actuator 192 moves the first cam plate 188 in a direction (in this configuration, a direction perpendicular to the stroke direction) intersecting the stroke direction of the first cam plate 188. That is, the first actuator 192 can move the first cam plate 188, to thereby change a relative position of the first cam plate 188 with respect to the plunger 182b.

When the first cam plate 188 moves in the direction perpendicular to the stroke direction, the contact position between the plunger 182b and the first cam plate 188 in the stroke direction relatively changes. For example, when the first cam plate 188 moves toward a left side of FIG. 5, the contact position is displaced upward in the stroke direction. Moreover, when the first cam plate 188 moves toward a right side of FIG. 5, the contact position is displaced downward in the stroke direction. The maximum amount to be pushed into the pump cylinder 182a is set in accordance with the contact position.

The spill valve 184 includes a main body 184a, a valve body 184b, and a rod 184c. An internal flow passage through which the working oil having been discharged from the first hydraulic chamber 168a can flow is formed inside the main body 184a. The valve body 184b is arranged in the internal flow passage of the main body 184a. The rod 184c has one end opposed to the valve body 184b inside the main body 184a, and another end protruding from the main body 184a.

The second cam plate 190 includes an inclined surface 190a inclined with respect to the stroke direction. The second cam plate 190 is arranged below the rod 184c in the stroke direction. When the spill valve 184 moves integrally with the crosshead pin 114a in the stroke direction, the one end of the rod 184c protruding from the main body 184a of the spill valve 184 comes in contact with the inclined surface 190a of the second cam plate 190 at a crank angle close to the bottom dead center.

The rod 184c receives a reaction force corresponding to the reciprocating force of the crosshead 114 from the inclined surface 190a of the second cam plate 190, and is consequently pushed into the main body 184a. When the rod 184c is pushed into the main body 184a by an amount equal to or larger than a predetermined amount, the spill valve 184 moves the valve body 184b. When the valve body 184b moves, the working oil comes to be able to flow through the internal flow passage of the spill valve 184, and the working oil is thus discharged from the first hydraulic chamber 168a toward a tank T.

The second actuator 194 is operated through use of, for example, the hydraulic pressure of the working oil supplied through the second selector valve 200. The second actuator 194 moves the second cam plate 190 in a direction (in this configuration, a direction perpendicular to the stroke direction) intersecting the stroke direction of the second cam plate 190. That is, the second actuator 194 can move the second cam plate 190, to thereby change a relative position of the second cam plate 190 with respect to the rod 184c.

The contact position between the rod 184c and the second cam plate 190 in the stroke direction changes in accordance with the relative position of the second cam plate 190. For example, when the second cam plate 190 moves toward the left side of FIG. 5, the contact position is displaced upward in the stroke direction. Moreover, when the second cam plate 190 moves toward the right side of FIG. 5, the contact position is displaced downward in the stroke direction. The maximum amount to be pushed into the spill valve 184 is set in accordance with the contact position.

The position sensor 202 detects a position of the piston rod 112a in the stroke direction, to thereby output a signal indicating the position in the stroke direction.

The hydraulic pressure controller 204 acquires the signal from the position sensor 202, and identifies the relative position between the piston rod 112a and the crosshead pin 114a. The hydraulic pressure controller 204 causes the first actuator 192 and the second actuator 194 to drive so that the relative position between the piston rod 112a and the crosshead pin 114a is a set position, to thereby adjust the hydraulic pressure (oil amount of the working oil) in the first hydraulic chamber 168a.

In such a manner, the hydraulic pressure adjustment mechanism 196 supplies the working oil to the first hydraulic chamber 168a, or discharges the working oil from the first hydraulic chamber 168a.

Figure 6A:
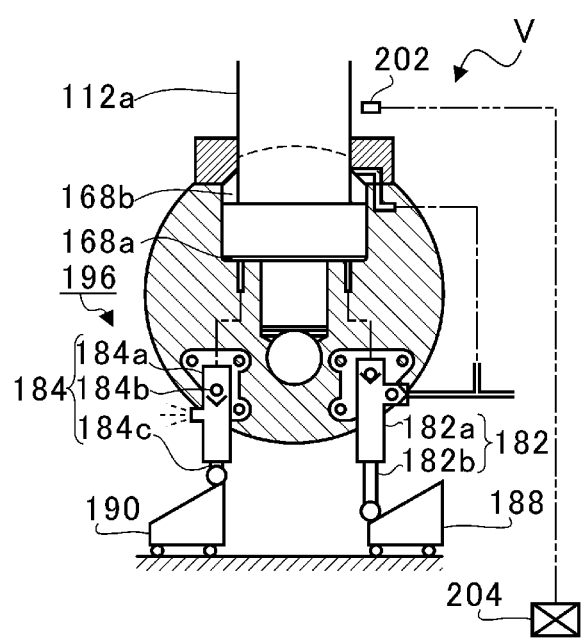
FIG. 6A is a view for illustrating a state in which working oil is being discharged from a first hydraulic chamber.
Figure 6B:
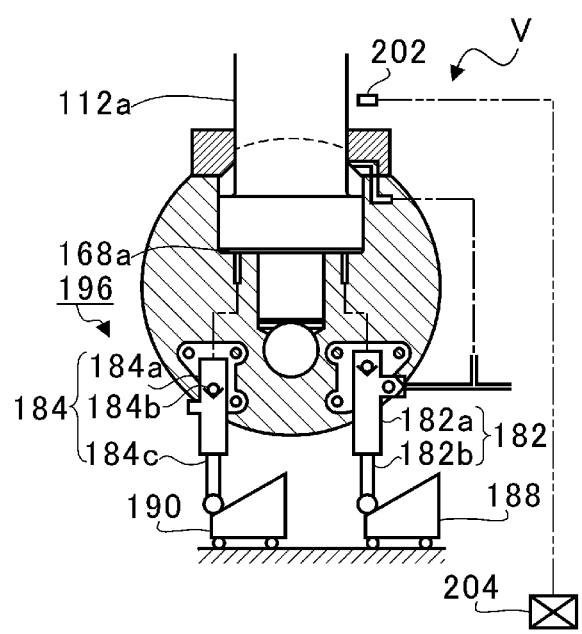
FIG. 6B is a view for illustrating a state in which the discharge of the working oil from the first hydraulic chamber is stopped.
Figure 6C:
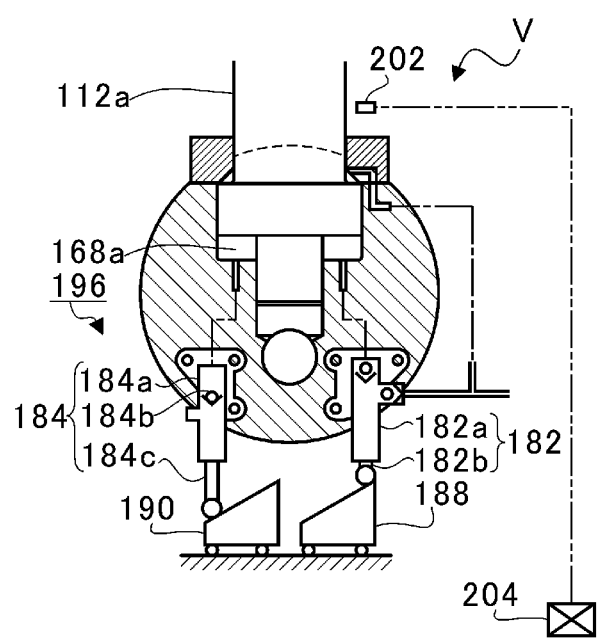
FIG. 6C is a view for illustrating a state in which the working oil is being supplied to the first hydraulic chamber.
Figure 6D:
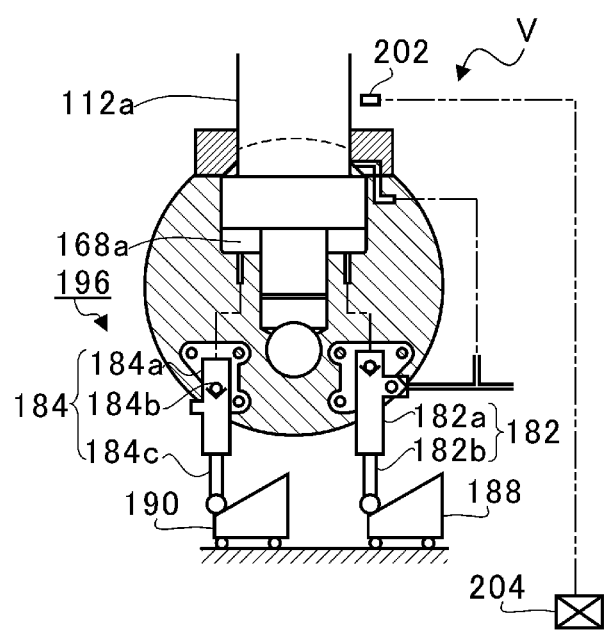
FIG. 6D is a view for illustrating a state in which the supply of the working oil to the first hydraulic chamber is stopped.

FIG. 6A is a view for illustrating a state in which the working oil is being discharged from the first hydraulic chamber 168a. FIG. 6B is a view for illustrating a state in which the discharge of the working oil from the first hydraulic chamber 168a is stopped. FIG. 6C is a view for illustrating a state in which the working oil is being supplied to the first hydraulic chamber 168a. FIG. 6D is a view for illustrating a state in which the supply of the working oil to the first hydraulic chamber 168a is stopped. FIG. 6A, FIG. 6B, FIG. 6C, and FIG. 6D show an operation of the compression ratio varying mechanism V.

In FIG. 6A, the relative position of the second cam plate 190 is adjusted so that the contact position between the rod 184c and the second cam plate 190 is a relatively high position. Therefore, the rod 184c is deeply pushed into the main body 184a of the spill valve 184 at a crank angle close to the bottom dead center. As a result, the spill valve 184 is opened, and the working oil is discharged from the first hydraulic chamber 168a. In this state, the hydraulic pressure of a hydraulic pump P is acting on the second hydraulic chamber 168b, and the relative position between the piston rod 112a and the crosshead pin 114a are thus stably maintained.

In this state, the top dead center of the piston 112 is lowered (close to the crosshead pin 114a side). That is, the compression ratio of the uniflow scavenging two-cycle engine 100 is low.

When the hydraulic pressure controller 204 receives an instruction to increase the compression ratio of the uniflow scavenging type two-cycle engine 100 from a host controller such as an engine controlling unit (ECU), as illustrated in FIG. 6B, the hydraulic pressure controller 204 moves the second cam plate 190 toward a right side of FIG. 6B. As a result, the contact position between the rod 184c and the second cam plate 190 is lowered, and the rod 184c is no longer pushed into the main body 184a even at the crank angle close to the bottom dead center. As a result, the spill valve 184 is maintained in the closed state regardless of the stroke position of the piston 112. That is, the working oil in the first hydraulic chamber 168a comes not to be discharged.

As illustrated in FIG. 6C, the hydraulic pressure controller 204 moves the first cam plate 188 toward a left side of FIG. 6C. As a result, the contact position between the plunger 182b and the first cam plate 188 is raised. The plunger 182b is pushed into the pump cylinder 182a at a crank angle close to the bottom dead center by a reaction force from the first cam plate 188. As a result, the working oil in the pump cylinder 182a is forced into the first hydraulic chamber 168a.

When the working oil is forced into the first hydraulic chamber 168a, the piston rod 112a is pushed upward by the hydraulic pressure. As illustrated in FIG. 6C, the relative position between the piston rod 112a and the crosshead pin 114a is displaced, thereby raising the top dead center of the piston 112 (moving away the top dead center from the crosshead pin 114a). That is, the compression ratio of the uniflow scavenging two-cycle engine 100 increases.

The plunger pump 182 forces the working oil stored in the plunger pump 182 into the first hydraulic chamber 168a at every stroke of the piston 112. In this configuration, it is assumed that the maximum volume of the first hydraulic chamber 168a is several times larger than the maximum volume in the plunger pump 182. The hydraulic pressure controller 204 adjusts the amount of the working oil forced into the first hydraulic chamber 168a in accordance with an amount of the operation of the plunger pump 182 corresponding to the number of strokes of the piston 112, to thereby adjust an amount the piston rod 112a to be pushed upward.

When the relative position between the piston rod 112a and the crosshead pin 114a reaches a desired position, the hydraulic pressure controller 204 moves the first cam plate 188 toward a right side of FIG. 6D, to thereby lower the contact position between the plunger 182b and the first cam plate 188. As a result, the plunger 182b is not pushed into the pump cylinder 182a even at a crank angle close to the bottom dead center, and the plunger pump 182 comes to be out of operation. That is, the forcing of the working oil into the first hydraulic chamber 168a is stopped.

In such a manner, the hydraulic pressure adjustment mechanism 196 adjusts the entry position of the piston rod 112a into the first hydraulic chamber 168a in the stroke direction. The compression ratio varying mechanism V adjusts the hydraulic pressure in the first hydraulic chamber 168a through use of the hydraulic pressure adjustment mechanism 196 to change the relative position between the piston rod 112a and the crosshead pin 114 in the stroke direction so that the top dead center and the bottom dead center of the piston 112 are changed.

Figure 7:
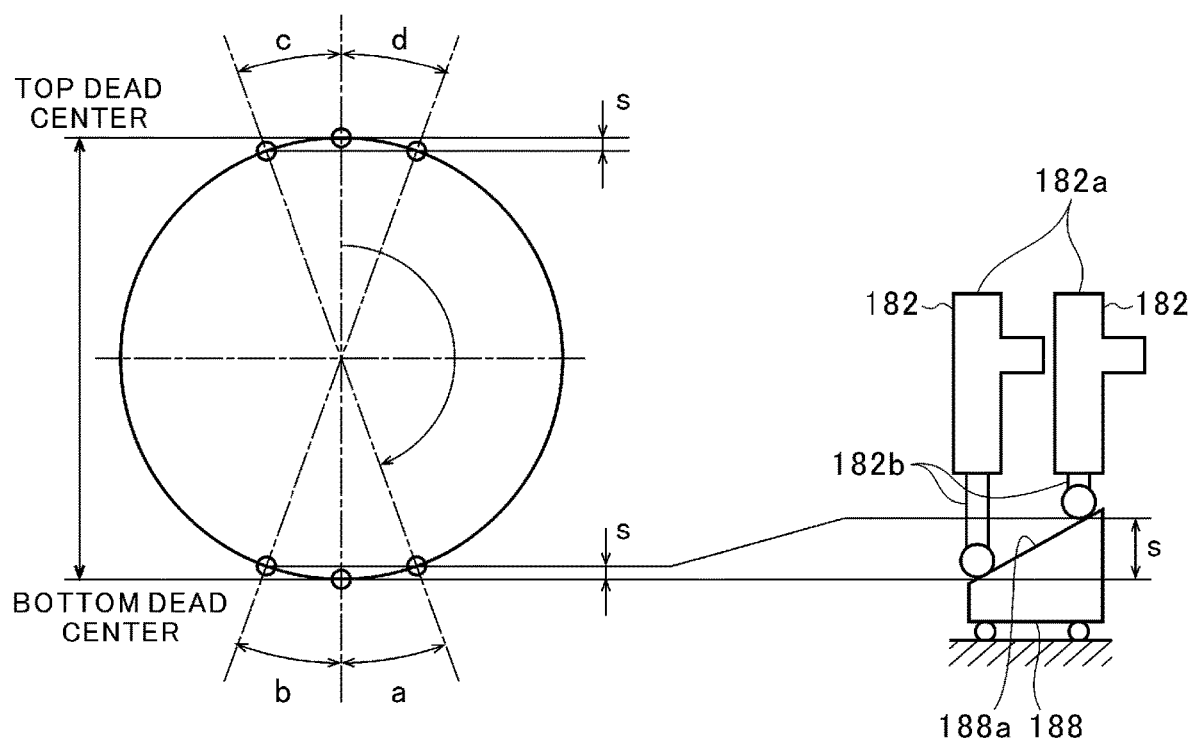
FIG. 7 is an explanatory view for illustrating a crank angle and basic operation timings of a plunger pump and a spill valve.

FIG. 7 is an explanatory view for illustrating the crank angle and basic operation timings of the plunger pump 182 and the spill valve 184. In FIG. 7, two plunger pumps 182 different in contact position between the first cam plate 188 and the inclined surface 188a are illustrated side by side for the convenience of description. However, the number of the plunger pumps 182 is actually one, and the contact position with the plunger pump 182 is displaced through the movement of the first cam plate 188. Moreover, the spill valve 184 and the second cam plate 190 are not illustrated.

As illustrated in FIG. 7, a range of the crank angle from an angle before the bottom dead center to the bottom dead center is set to an angle "a", and a range of the crank angle of a phase angle equal to the magnitude of the angle "a" from the bottom dead center is set to an angle "b". Moreover, a range of the crank angle from an angle before the top dead center to the top dead center is set to an angle "c", and a range of the crank angle of a phase angle equal to the magnitude of the angle "c" from the top dead center is set to an angle "d".

When the relative position between the plunger pump 182 and the first cam plate 188 is in the state indicated by the plunger pump 182 illustrated on the right side of FIG. 7, the plunger 182*b* starts the contact with the inclined surface 188*a* of the first cam plate 188 at the start position at which the crank angle is the angle "a". The contact of the plunger 182*b* with the inclined surface 188*a* is released at an end position at which the crank angle is the angle "b" after the bottom dead center. In FIG. 7, a stroke width of the plunger pump 182 is indicated by a width "s".

When the relative position between the plunger pump 182 and the first cam plate 188 is in the state indicated by the plunger pump 182 illustrated on the left side of FIG. 7, the plunger 182*b* of the plunger pump 182 comes in contact under a state in which the crank angle is at the bottom dead center. However, the plunger 182*b* separates immediately without being pushed into the pump cylinder 182*a*. In such a manner, the plunger pump 182 operates in the ranges in which the crank angle is within the angle "a" and the angle "b". Specifically, when the crank angle is in the range of the angle "a", the plunger pump 182 forces the working oil into the first hydraulic chamber 168*a*. Moreover, when the crank angle is in the range of the angle "b", the plunger pump 182 sucks the working oil.

Similarly, the spill valve 184 operates in the ranges in which the crank angle is within the angle "a" and the angle "b". Specifically, the spill valve 184 discharges the working oil from the first hydraulic chamber 168*a* when the crank angle is in the range from the start position of the angle "a" to the end position of the angle "b".

A description has been given of the case in which the plunger pump 182 and the spill valve 184 operate in the ranges in which the crank angle is within the angle "a" and the angle "b". However, the plunger pump 182 and the spill valve 184 may operate in the ranges in which the crank angle is within the angle "c" and the angle "d". In this case, when the crank angle is in the range of the angle "c", the plunger pump 182 presses the working oil into the first hydraulic chamber 168*a*. Moreover, when the crank angle is in the range of the angle "d", the plunger pump 182 sucks the working oil. Further, the spill valve 184 discharges the working oil from the first hydraulic chamber 168*a* when the crank angle is in the range from the start position of the angle "c" to the end position of the angle "d".

When the plunger pump 182 and the spill valve 184 are operated in a stroke range other than those of the top dead center and the bottom dead center, the first cam plate 188, the second cam plate 190, and the like need to be moved in synchronization with the reciprocations of the plunger pump 182 and the spill valve 184. However, when the plunger pump 182 and the spill valve 184 are operated in the vicinity of the top dead center or the bottom dead center as in this embodiment, such a synchronizing mechanism does not need to be provided, thereby being capable of reducing a cost.

When the plunger pump 182 and the spill valve 184 operate in the angle ranges (the angle "a" and the angle "b") of the crank angle on both sides of the bottom dead center, the pressure in the cylinder 110 is lower, and the working oil can thus more easily be forced into the first hydraulic chamber 168*a* from the plunger pump 182. Moreover, the hydraulic pressure of the working oil discharged from the spill valve 184 is also lower, occurrence of cavitation is thus suppressed, and a load that operates the spill valve 184 can be suppressed to be lower. Further, it is possible to avoid a state in which the pressure of the working oil is high, and the position of the piston 112 thus becomes unstable.

Incidentally, a biasing part described later is provided in the plunger pump 182 so that the plunger 182*b* is pulled out from the inside of the pump cylinder 182*a* after the plunger 182*b* is pushed into the pump cylinder 182*a*. When the crank angle is at the start position of the angle "b", the biasing part starts pulling out the plunger 182*b* from the pump cylinder 182*a*. The biasing part completes the pulling-out of the plunger 182*b* from the pump cylinder 182*a* when the crank angle reaches the end position of the angle "b". In this case, the plunger pump 182 starts the suction of the working oil when the crank angle is at the start position of the angle "b", and finishes the suction of the working oil when the crank angle is at the end position of the angle "b".

When the plunger pump 182 starts the suction of the working oil at the start position at which the crank angle is the angle "b", and finishes the suction of the working oil at the end position at which the crank angle is the angle "b", the working oil is quickly sucked. When the working oil is quickly sucked, the supply pressure becomes negative, and there is a fear in that the cavitation may occur.

Thus, the compression ratio varying mechanism V according to this embodiment includes the plunger pump 182 having a configuration described below in order to suppress the occurrence of the cavitation. A description is now given of a specific configuration of the plunger pump 182 in this embodiment.

Figure 8:
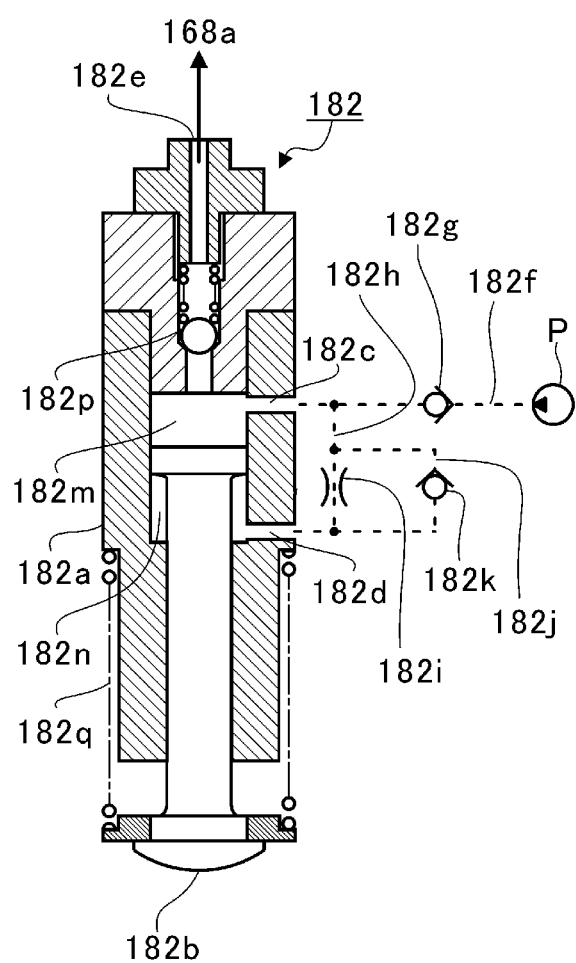
FIG. 8 is an explanatory view for illustrating a configuration of the plunger pump in an embodiment.

FIG. 8 is an explanatory view for illustrating a configuration of the plunger pump 182 in this embodiment. FIG. 8 is a sectional view on a plane including a center axis of the plunger 182*b*. As illustrated in FIG. 8, a first inflow port 182*c*, a second inflow port 182*d*, and a discharge port 182*e* are provided in the pump cylinder 182*a*.

The first inflow port 182*c* is connected to a supply oil passage 182*f*. The supply oil passage 182*f* is connected to the hydraulic pump P. The supply oil passage 182*f* supplies the working oil fed out from the hydraulic pump P to the first inflow port 182*c*. A check valve 182*g* is provided in the supply oil passage 182*f* between the hydraulic pump P and the first inflow port 182*c*. The check valve 182*g* is configured to open when the working oil flows from the hydraulic pump P toward the first inflow port 182*c*, and limit (close) a flow of the working oil from a first inflow port 182*c* side toward a hydraulic pump P side.

A branch oil passage (communication passage) 182*h* is connected to the supply oil passage 182*f* between the check valve 182*g* and the first inflow port 182*c*. The second inflow port 182*d* is connected to the branch oil passage 182*h*. Thus, one end of the branch oil passage 182*h* is connected to the supply oil passage 182*f*. Another end of the branch oil passage 182*h* is connected to the second inflow port 182*d*.

An orifice 182*i* configured to throttle an oil amount of the working oil flowing through the branch oil passage 182*h* is provided in the branch oil passage 182*h*. Moreover, a bypass oil passage 182*j* configured to bypass the orifice 182*i* is connected to the branch oil passage 182*h*.

One end of the bypass oil passage 182*j* is connected between the supply oil passage 182*f* and the orifice 182*i*. Another end of the bypass oil passage 182*j* is connected between the second inflow port 182*d* and the orifice 182*i*. The bypass oil passage 182*j* is connected to a side of a first oil storage chamber and a side of a second oil storage chamber described later with the orifice 182*i* as a boundary.

A check valve 182*k* is provided in the bypass oil passage 182*j*. The check valve 182*k* is provided in parallel with the orifice 182*i*. The check valve 182*k* is configured to open when the working oil flows from the first inflow port 182*c* toward the second inflow port 182*d*, and limit (close) a flow of the working oil from the second inflow port 182*d* (second oil storage chamber) side toward the first inflow port 182*c* (first oil storage chamber) side.

As illustrated in FIG. 8, a first oil storage chamber 182*m* and a second oil storage chamber 182*n* partitioned by the plunger 182*b* are formed inside the pump cylinder 182*a*. The first inflow port 182*c* communicates with the first oil storage chamber 182*m*. The first oil storage chamber 182*m* communicates with the supply oil passage 182*f*. The first oil storage chamber 182*m* is configured to store the working oil having flowed in from the supply oil passage 182*f* through the first inflow port 182*c*.

The first oil storage chamber 182*m* communicates with the discharge port 182*e*. A check valve 182*p* is provided between the first oil storage chamber 182*m* and the discharge port 182*e*. The check valve 182*p* is configured to open when the working oil flows from the first oil storage chamber 182*m* toward the discharge port 182*e*, and limit (close) a flow of the working oil from a discharge port 182*e* side toward a first oil storage chamber 182*m* side. The discharge port 182*e* is connected to the first hydraulic chamber 168*a* through the first oil passage (discharge oil passage) 170*a*. The discharge port 182*e* is configured to supply (discharge) the working oil stored in the first oil storage chamber 182*m* to the first hydraulic chamber 168*a*.

The second inflow port 182*d* communicates with the second oil storage chamber 182*n*. The second oil storage chamber 182*n* communicates with the branch oil passage 182*h*. The second oil storage chamber 182*n* is configured to store the working oil having flowed in from the branch oil passage 182*h* through the second inflow port 182*d*.

The biasing part 182*q* is formed of, for example, a coil spring. The biasing part 182*q* has one end held by the pump cylinder 182*a*, and another end held by the plunger 182*b*. The biasing part 182*q* is configured to apply a biasing force of biasing the plunger 182*b* toward a side away from the pump cylinder 182*a* (a first cam plate 188 side) to the plunger 182*b*.

Figure 9A:
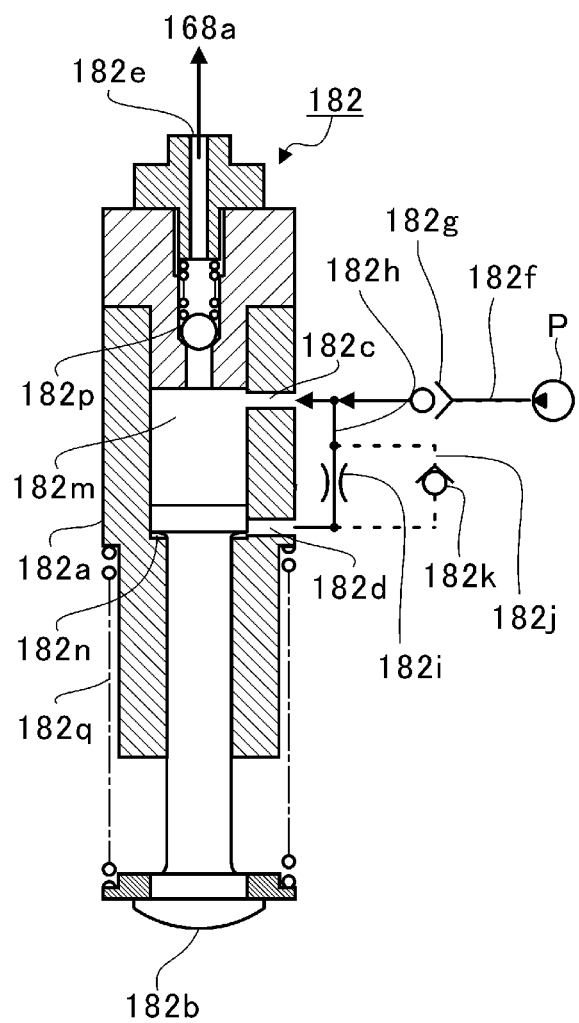
FIG. 9A is a view for illustrating a state in which the working oil is sucked into a first oil storage chamber.
Figure 9B:
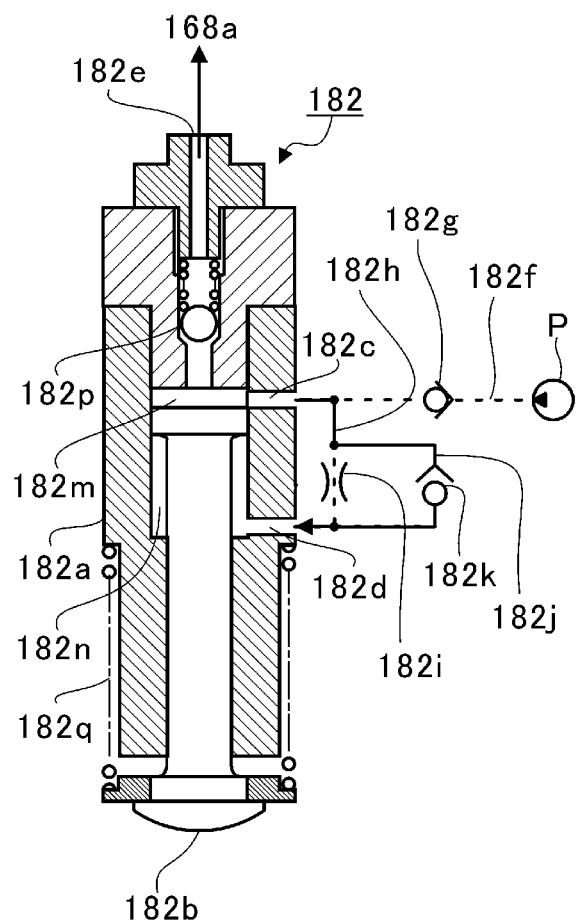
FIG. 9B is a view for illustrating a state in which the working oil is supplied from the first oil storage chamber to the first hydraulic chamber.

A description is now given of an operation of the plunger pump 182 in this embodiment. FIG. 9A is a view for illustrating the state in which the working oil is sucked into the first oil storage chamber 182*m*. FIG. 9B is a view for illustrating the state in which the working oil is supplied from the first oil storage chamber 182*m* to the first hydraulic chamber 168*a*. In FIG. 9A and FIG. 9B, the operation of the plunger pump 182 in this embodiment is illustrated. As described with reference to FIG. 7, when the crank angle is in the range of the angle "a", the plunger pump 182 supplies the working oil to the first hydraulic chamber 168*a*. In this state, the plunger 182*b* is pushed into the pump cylinder 182*a* by the first cam plate 188, and is brought from the state illustrated in FIG. 9A into the state illustrated in FIG. 9B.

The plunger 182*b* presses the working oil stored in the first oil storage chamber 182*m* when the plunger 182*b* is brought from the state illustrated in FIG. 9A into the state illustrated in FIG. 9B. A part of the working oil stored in the first oil storage chamber 182*m* is pressed by the plunger 182*b*, thereby being discharged (supplied) from the discharge port 182*e* to the first hydraulic chamber 168*a*.

Moreover, a part of the working oil stored in the first oil storage chamber 182*m* is pressed by the plunger 182*b*, thereby being discharged from the first inflow port 182*c* to the supply oil passage 182*f*. In the configuration, the check valve 182*g* is provided in the supply oil passage 182*f*. Therefore, as illustrated in FIG. 9B, the working oil discharged from the first inflow port 182*c* to the supply oil passage 182*f* flows into the branch oil passage 182*h*.

The orifice 182*i* is provided in the branch oil passage 182*h*. The branch oil passage 182*h* is throttled by the orifice 182*i*, and the oil amount flowing through the branch oil passage 182*h* is thus limited. Therefore, a large part of the working oil flowing through the branch oil passage 182*h* flows into the bypass oil passage 182*j*.

The check valve 182*k* is provided in the bypass oil passage 182*j*. The check valve 182*k* opens when the working oil flows from the first inflow port 182*c* toward the second inflow port 182*d*. Therefore, the working oil having flowed into the bypass oil passage 182*j* passes through the check valve 182*k*, and flows from the second inflow port 182*d* into the second oil storage chamber 182*n*.

A partition wall, which partitions the first oil storage chamber 182*m* and the second oil storage chamber 182*n* of the plunger 182*b*, has a wider area on a first oil storage chamber 182*m* side than on a second oil storage chamber 182*n* side. Moreover, the maximum capacity of the first oil storage chamber 182*m* is larger than the maximum capacity of the second oil storage chamber 182*n*. That is, in the state illustrated in FIG. 9A, the working oil having an amount larger than the maximum capacity of the second oil storage chamber 182*n* is stored in the first oil storage chamber 182*m*. Thus, when the state illustrated in FIG. 9A is brought into the state illustrated in FIG. 9B, the first oil storage chamber 182*m* supplies the working oil (oil amount) corresponding to a difference between the maximum capacity of the first oil storage chamber 182*m* and the maximum capacity of the second oil storage chamber 182*n* to the first hydraulic chamber 168*a*. Moreover, the first oil storage chamber 182*m* supplies the working oil (oil amount) corresponding to the maximum capacity of the second oil storage chamber 182*n* to the second oil storage chamber 182*n*.

Meanwhile, when the crank angle exceeds the range of the angle "a" (the start position of the angle "b"), the plunger pump 182 starts the suction operation of sucking the working oil into the first oil storage chamber 182*m*. In this state, the plunger 182*b* is pulled out from the pump cylinder 182*a* by the biasing part 182*q*, and is brought from the state illustrated in FIG. 9B into the state illustrated in FIG. 9A.

Specifically, in the state illustrated in FIG. 9B, when the plunger 182*b* moves toward a direction away from the first cam plate 188 in the upstroke of the piston 112, the plunger 182*b* returns to the position illustrated in FIG. 9A through the biasing force of the biasing part 182*q*. In the course of the movement of the plunger 182*b*, the working oil flows from the first inflow port 182*c* into the first oil storage chamber 182*m*.

The working oil having flowed into the first oil storage chamber 182*m* is to be supplied from the discharge port 182*e* toward the first hydraulic chamber 168*a* when the plunger 182*b* is pushed into the pump cylinder 182*a* for the next time.

The plunger 182*b* presses the working oil stored in the second oil storage chamber 182*n* when the plunger 182*b* is brought from the state illustrated in FIG. 9B into the state illustrated in FIG. 9A. As illustrated in FIG. 9A, the working oil stored in the second oil storage chamber 182*n* is pressed by the plunger 182*b*, thereby being discharged (supplied) from the second inflow port 182*d* to the branch oil passage 182*h*.

The orifice 182*i* is provided in the branch oil passage 182*h*. The branch oil passage 182*h* is throttled by the orifice 182*i*, and the oil amount flowing through the branch oil passage 182*h* is thus limited. The working oil having been discharged from the second inflow port 182*d* to the branch oil passage 182*h* flows through the branch oil passage 182*h* while being throttled by the orifice 182*i*, and flows into the supply oil passage 182*f*.

The working oil supplied from the hydraulic pump P flows into the supply oil passage 182f. As a result, the working oil having flowed from the branch oil passage 182h into the supply oil passage 182f merges with the working oil flowing through the supply oil passage 182f. The working oil having merged in the supply oil passage 182f flows into the first oil storage chamber 182m through the first inflow port 182c.

As described above, when the plunger 182b is brought from the state illustrated in FIG. 9B into the state illustrated in FIG. 9A, the plunger 182b supplies the working oil stored in the second oil storage chamber 182n to the first oil storage chamber 182m through the orifice 182i provided in the branch oil passage 182h.

As a result, the oil amount of the working oil discharged from the second inflow port 182d is throttled while the working oil is passing through the orifice 182i. When the oil amount is throttled while the working oil is passing through the orifice 182i, the working oil stored in the second oil storage chamber 182n is less likely to be discharged. When the working oil stored in the second oil storage chamber 182n is less likely to be discharged, the plunger 182b is less likely to move toward the direction away from the pump cylinder 182a.

When the plunger 182b is less likely to move, an inflow amount of the working oil flowing from the first inflow port 182c into the first oil storage chamber 182m is also limited. As a result, a flow amount variation in the supply oil passage 182f becomes slow, the supply pressure thus is less likely to become negative, and the occurrence of the cavitation can be suppressed.

As described above, in this embodiment, the plunger 182b is less likely to move when the plunger 182b is pulled out. As a result, a period in which the plunger 182b is pulled out is longer than a period in which the plunger 182b is pushed in.

Specifically, a period in which the plunger 182b moves from the minimum protruded position (position illustrated in FIG. 9B) to the maximum protruded position (position illustrated in FIG. 9A) is longer than a period in which the plunger 182 moves from the maximum protruded position to the minimum protruded position. Thus, the plunger pump 182 in this embodiment supplies the working oil to the first hydraulic chamber 168a when the crank angle is in the range of the angle "a". Moreover, the plunger pump 182 in this embodiment sucks the working oil into the first oil storage chamber 182m when the crank angle is in the range larger than the angle "b".

In such a manner, the plunger pump 182 in this embodiment increases the period in which the working oil is supplied to the first oil storage chamber 182m, to thereby slow the flow amount variation in the supply oil passage 182f. As a result, the supply pressure in the supply oil passage 182f is less likely to become negative, thereby being capable of suppressing the occurrence of the cavitation.

As described above, the plunger pump 182 in this embodiment reciprocates the plunger 182b through the adjustment of the oil amounts stored in the first oil storage chamber 182m and the second oil storage chamber 182n and a restoration force of the biasing part 182q. The plunger pump 182 in this embodiment is formed of a plunger pump of a so-called double acting type.

In the compression ratio varying mechanism V according to this embodiment, the orifice 182i is provided in the communication passage (branch oil passage 182h), which communicates the first inflow port 182c and the second inflow port 182d with each other.

Therefore, a flow amount of the working oil stored in the second oil storage chamber 182n is limited by the orifice 182i when the working oil flows toward the first oil storage chamber 182m through the communication passage. As a result, the speed at which the plunger 182b moves in the direction away from the pump cylinder 182a can be reduced. As a result, the flow amount variation in the supply oil passage 182f is suppressed, thereby being capable of suppressing the occurrence of the cavitation.

Modification Example

Figure 10:
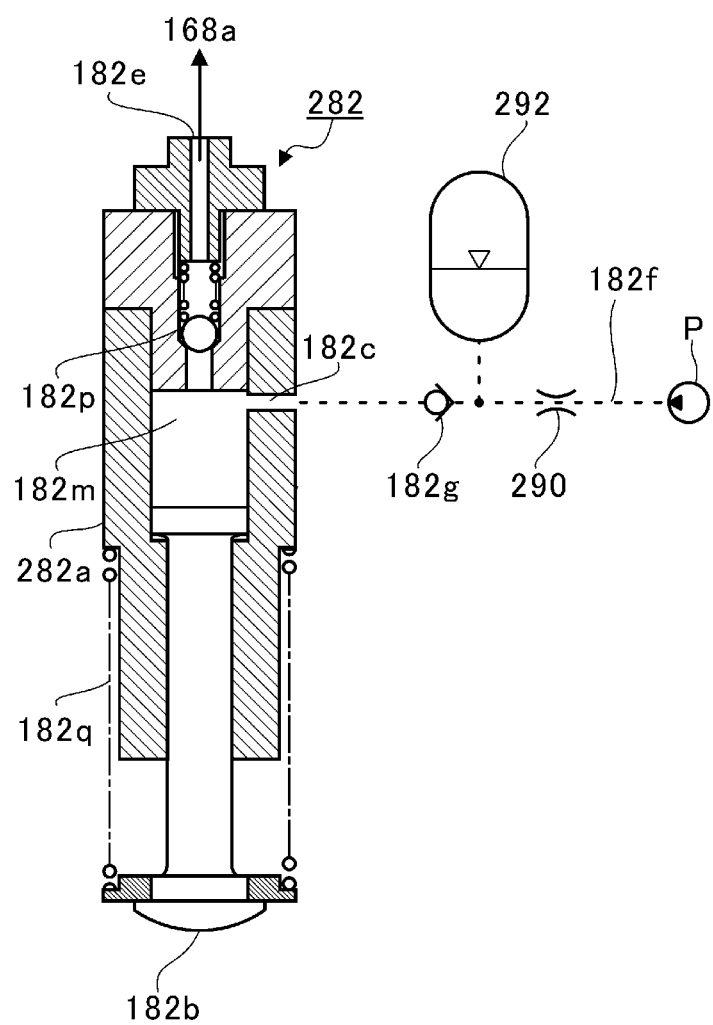
FIG. 10 is an explanatory view for illustrating a configuration of a plunger pump in a modification example.

FIG. 10 is an explanatory view for illustrating a configuration of a plunger pump 282 in a modification example. In this modification example, elements having substantially the same functions and configurations are denoted by the same reference symbols, and descriptions thereof are omitted. FIG. 10 is a sectional view on the plane including the center axis of the plunger 182b. The first inflow port 182c and the discharge port 182e are provided in a pump cylinder 282a.

The first inflow port 182c is connected to the supply oil passage 182f. The hydraulic pump P is connected to the supply oil passage 182f. The check valve 182g is provided in the supply oil passage 182f between the hydraulic pump P and the first inflow port 182c. The first inflow port 182c communicates with the first oil storage chamber 182m in the pump cylinder 282a.

In this modification example, an orifice 290 and an accumulator 292 are provided between hydraulic pump P and the check valve 182g in the supply oil passage 182f. The accumulator 292 is connected to the supply oil passage 182f between the orifice 290 and the check valve 182g. The orifice 290 is provided in the supply oil passage 182f between a connection point to the accumulator 292 and the hydraulic pump P.

Pressure storage gas enclosed in a rubber bladder or the like is filled inside the accumulator 292. When the working oil is fed out from the hydraulic pump P, the pressure storage gas in the accumulator 292 is compressed, and the accumulator 292 stores the pressurized working oil.

The working oil is stored in a period from a time at which the pressure in the supply oil passage 182f decreases to a time at which the pressure in the supply oil passage 182f decreases for the next time. For example, the working oil is stored in a period from a time at which the working oil is supplied from the first inflow port 182c to the first oil storage chamber 182m to a time at which the working oil is supplied from the first inflow port 182c to the first oil storage chamber 182m for the next time. In this state, the working oil in a volume equal to or larger than the maximum volume of the first oil storage chamber 182m is stored in the accumulator 292.

As described above, the accumulator 292 stores the oil amount required to push in the plunger 182b for the next time in the period until the plunger 182b is pushed in for the next time.

When the working oil is supplied from the first inflow port 182c to the first oil storage chamber 182m, the pressure in the supply oil passage 182f decreases. When the pressure in the supply oil passage 182f decreases, the pressure storage gas expands, and the accumulator 292 instantaneously pushes out and releases the stored working oil.

As a result, the supply oil passage 182f can instantaneously supply the working oil required for the first oil storage chamber 182m of the plunger pump 282 from the accumulator 292 in a very short period in which the piston 112 moves in the vicinity of the bottom dead center (angle "b"). That is, the accumulator 292 can supply the working oil (oil amount) more than the working oil (oil amount) that the hydraulic pump P can supply through the supply oil passage 182$f$ in the very short period in which the piston 112 moves in the vicinity of the bottom dead center (angle "b").

Moreover, the flow amount of the working oil flowing from the hydraulic pump P toward the first inflow port 182$c$ is limited through providing the orifice 290 between the accumulator 292 and the hydraulic pump P. As a result, when the working oil is supplied from the first inflow port 182$c$ to the first oil storage chamber 182$m$, the flow amount variation is suppressed in the supply oil passage 182$f$ between the orifice 290 and the hydraulic pump P, and the supply pressure is less likely to become negative, thereby being capable of suppressing the occurrence of the cavitation.

As described above, the second inflow port 182$d$ is not provided in the pump cylinder 282$a$ in the modification example, which is different from the embodiment. Moreover, the communication passage (branch oil passage 182$h$) that communicates the first inflow port 182$c$ and the second inflow port 182$d$ with each other is not provided either. The plunger pump 282 in this modification example reciprocates the plunger 182$b$ through the adjustment of the oil amount stored in the first oil storage chamber 182$m$ and the restoration force of the biasing part 182$q$. The plunger pump 282 in this modification example is formed of a plunger pump of a so-called single-acting type.

With the compression ratio varying mechanism V according to this modification example, the supply oil passage 182$f$ includes the orifice 290 and the accumulator 292. Therefore, the supply oil passage 182$f$ can instantaneously supply the working oil from the accumulator 292 to the first oil storage chamber 182$m$ through the first inflow port 182$c$. Moreover, the orifice 290 can suppress the flow amount variation in the supply oil passage 182$f$. Thus, the supply pressure is less likely to become negative in the compression ratio varying mechanism V according to this modification example even when the plunger pump 282 is formed of a plunger pump of the single-acting type, and the compression ratio varying mechanism V can thus suppress the occurrence of the cavitation.

The embodiment according to the present disclosure has been described above with reference to the attached drawings, but, needless to say, the present disclosure is not limited to the above-mentioned embodiment. It is apparent that those skilled in the art may arrive at various alternations and modifications within the scope of claims, and those examples are construed as naturally falling within the technical scope of the present disclosure.

In the above-mentioned embodiment, a description is given of the configuration in which the orifice 182$i$ is provided in the communication passage (branch oil passage 182$h$), which communicates the first oil storage chamber 182$m$ and the second oil storage chamber 182$n$ with each other. However, the configuration is not limited to this case, and the first oil storage chamber 182$m$ may communicate with the first communication passage (supply oil passage 182$f$), and the second oil storage chamber 182$n$ may communicate with a second communication passage different from the first communication passage (that is, a second communication passage independent of the first communication passage). In other words, the second oil storage chamber 182$n$ is not required to communicate with the first oil storage chamber 182$m$. In this case, the orifice 182$i$ may be provided in the second communication passage, and the second oil storage chamber 182$n$ may discharge the working oil from the second communication passage through the orifice 182$i$. Moreover, when the orifice 182$i$ is provided in the second communication passage, the second oil storage chamber 182$n$ may communicate with a third communication passage different from the first communication passage and the second communication passage (that is, a third communication passage independent of the first communication passage and the second communication passage), and the working oil may be supplied from the third communication passage to the second oil storage chamber 182$n$. In this configuration, a check valve may be provided in the third communication passage so that the working oil does not flow back from the second oil storage chamber 182$n$.

Also with this configuration, the same effect as that in the above-mentioned embodiment can be attained. However, the configuration of the above-mentioned embodiment is simpler than the configuration in which the second communication passage and the third communication passage are provided for the second oil storage chamber 182$n$, and the above-mentioned embodiment is thus preferred.

Moreover, in the above-mentioned modification example, a description is given of the example in which the orifice 290 and the accumulator 292 are provided in the supply oil passage 182$f$. However, the configuration is not limited to this case, and there may be provide a configuration in which the orifice 290 is not provided in the supply oil passage 182$f$, and only the accumulator 292 is provided. When the accumulator 292 is provided, the supply oil passage 182$f$ can instantaneously supply the working oil from the first inflow port 182$c$ to the first oil storage chamber 182$m$. Thus, the supply pressure is less likely to become negative even when the plunger pump 282 is formed of a plunger pump of the single-acting type, and the occurrence of the cavitation can thus be suppressed. However, the flow amount variation in the supply oil passage 182$f$ can be suppressed more in the case in which the orifice 290 is provided in the supply oil passage 182$f$, and this case is thus preferred.

Moreover, in the above-mentioned embodiment and modification example, a description is given of the example in which the hydraulic pump P is applied as the hydraulic pressure supply source configured to supply the working oil to the supply oil passage 182$f$. However, the configuration is not limited to this case, and, as the hydraulic pressure supply source configured to supply the working oil to the supply oil passage 182$f$, a plurality of plunger pumps 182 may be applied or the accumulator 292 may be applied.

Moreover, in the above-mentioned embodiment and modification example, there is provided the configuration in which the maximum amount of the plunger 182$b$ to be pushed into the pump cylinder 182$a$ or 282$a$ can be adjusted by the first cam plate 188 and the first actuator 192. Thus, there is provided the configuration in which the fine adjustment of the compression ratio is facilitated through the adjustment of the working oil to be forced in. For example, an amount of the working oil corresponding to the maximum volume of the first oil storage chamber 182$m$ may be forced into the first hydraulic chamber 168$a$ by one stroke. Moreover, the relative position of the first cam plate 188 may be adjusted so that an amount of the working oil corresponding to a half of the maximum volume of the first oil storage chamber 182$m$ is forced into the first hydraulic chamber 168$a$ by one stroke. In such a manner, the amount of the working oil to be forced into the first hydraulic chamber 168$a$ by one stroke can be suitably set in a range of the maximum volume of the first oil storage chamber 182$m$. However, the maximum amount of the plunger 182$b$ to be pushed into the pump cylinder 182$a$ is not required to be adjusted.

Moreover, there is provided the configuration in which the maximum amount of the rod 184c to be pushed into the main body 184a of the spill valve 184 can be adjusted through the second cam plate 190 and the second actuator 194. Thus, there is provided the configuration in which the fine adjustment of the compression ratio is facilitated through the adjustment of the amount of the working oil to be discharged per stroke. However, the maximum amount of the rod 184c to be pushed into the main body 184a of the spill valve 184 is not required to be adjusted.

In the above-mentioned embodiment and modification example, a description is given of the case in which the hydraulic chamber is formed between the stepped surface of the piston rod 112a and the stepped surface of the crosshead pin 114a. However, the hydraulic chamber may be formed between any members that form the piston 112. For example, the piston 112 may be divided into two portions, and the hydraulic chamber may be formed between the two divided portions of the piston 112. Similarly, the piston rod 112a may be divided into two portions, and the hydraulic chamber may be formed between the two divided portions of the piston rod 112a.

INDUSTRIAL APPLICABILITY

The present disclosure can be applied to a compression ratio varying mechanism.

What is claimed is:

1. A compression ratio varying mechanism, comprising:
   a discharge oil passage connected to a hydraulic chamber;
   a supply oil passage connected to a hydraulic pressure supply source;
   a pump cylinder including:
   a first oil storage chamber connected to the discharge oil passage and the supply oil passage; and
   a second oil storage chamber partitioned from the first oil storage chamber by a plunger;
   a communication passage connected to the second oil storage chamber;
   an orifice provided in the communication passage; and
   a biasing part that biases the plunger in a direction narrowing the second oil storage chamber.

2. The compression ratio varying mechanism according to claim 1, wherein the communication passage is configured to allow the first oil storage chamber and the second oil storage chamber to communicate with each other.

3. The compression ratio varying mechanism according to claim 2, further comprising:
   a bypass oil passage configured to connect a side of the first oil storage chamber and a side of the second oil storage chamber of the communication passage with each other with the orifice as a boundary; and
   a check valve, which is provided in the bypass oil passage, and is configured to limit a flow of working oil from the second oil storage chamber to the first oil storage chamber.

4. The compression ratio varying mechanism according to claim 1, wherein the biasing part comprises a coil spring.

5. The compression ratio varying mechanism according to claim 4, wherein a maximum capacity of the first oil storage chamber is larger than a maximum capacity of the second oil storage chamber.

6. The compression ratio varying mechanism according to claim 1, wherein a maximum capacity of the first oil storage chamber is larger than a maximum capacity of the second oil storage chamber.

\* \* \* \* \*